United States Patent [19]
DeFeo

[11] Patent Number: 5,899,464
[45] Date of Patent: May 4, 1999

[54] JAW ASSEMBLY FOR HOLDING A WORKPIECE

[75] Inventor: Paul J. DeFeo, Huntington, N.Y.

[73] Assignee: Northfield Precision Instruments Corporation, Island Park, N.Y.

[21] Appl. No.: 08/876,504

[22] Filed: Jun. 16, 1997

[51] Int. Cl.$^6$ .................................................. B23B 31/16
[52] U.S. Cl. .......................................... 279/124; 279/153
[58] Field of Search .................................... 279/123, 110, 279/124, 152, 153

[56] References Cited

U.S. PATENT DOCUMENTS

| | | | |
|---|---|---|---|
| 4,667,971 | 5/1987 | Norton et al. | 279/121 |
| 4,763,906 | 8/1988 | Barbieux | 279/123 |
| 4,946,177 | 8/1990 | Barbieux | 279/123 |

FOREIGN PATENT DOCUMENTS

| | | | |
|---|---|---|---|
| 238747 | 9/1986 | Germany | 279/124 |

OTHER PUBLICATIONS

Northfield Notes, "Changing Sizes" (Winter 1995).
MicroCentric, "Quick Change Jaw System" (undated).
MicroCentric Techspecs, "Quick Change Top Jaws–Precision Air Chucks" (Undated).
New Products, "Jaw System–MicroCentric Corp." (undated).
MicroCentric, "HPC High Precision Power Chucks" (undated).
MicroCentric, "The World's No. 1 Selling Precision Air Chucks" (undated).
MicroCentric, "The New Standard in CNC Collet Chucks" (undated).
MicroCentric, "Quick Change Collet System for Multiple Spindle Automatics" (undated).
MicroCentric, "Precision Air Chucks for Turning, Grinding, Boring, Milling, Inspection and Robotic Applications" (undated).
Powerhold, Inc., "Quick–Change Snap–In Top Jaws" (Jan., 1991).
Powerhold, Inc. "Precision High Speed Chucks" (Catalog 39–8–92).
Powerhold, Inc., "Ultra High Speed Chucks, Cylinders, and Jaws" (Catalog 40–8–88).
Powerhold, Inc., "Top Jaws" (Catalog 21–6–83).
Powerhold, Inc., "Power Chucking Manual" (Catalog 27–9–79).
Stace–Allen Chucks, "Power Series" (undated).
Kitagawa, "Workholding Systems" (undated).
Autoblok S.p.A., "Autoblok News–Information EM093" (undated).

*Primary Examiner*—Steven C. Bishop
*Attorney, Agent, or Firm*—Hoffmann & Baron, LLP

[57] ABSTRACT

A quick-change jaw assembly for use in machining operations. The assembly includes a top jaw which may be removed from a chuck and thereafter repositioned on the same or a different chuck without losing the accuracy previously established through machining of such jaws.

18 Claims, 14 Drawing Sheets

JAW ASSEMBLY FOR HOLDING A WORKPIECE

BACKGROUND OF THE INVENTION

The present invention relates to jaw assemblies for use with a chuck and, more particularly, to quick-change jaw assemblies which accurately locate the top jaws to achieve close tolerance workholding following jaw changeover without remachining of such top jaws.

Machining operations such as turning, grinding, milling and inspection require a workpiece to be held accurately with respect to the cutting tool. In many such applications, the design specifications require a repeatable accuracy of at least 0.0001" total indicator reading (TIR). Workpieces may be held with such accuracy by use of what are commonly referred to as "precision chucks." These chucks are typically power actuated, i.e., the jaw assemblies are movable in a radial direction (to grasp and release the workpiece) by means of an actuating mechanism and a source of power such as compressed air. To ensure the required accuracy, the top jaws used to hold the workpiece are typically machined to the required size and configuration once such jaws are secured to the chuck, the chuck being fixed to the machine.

However, as will be recognized by those skilled in the art, it is often necessary to change the top jaws to allow holding of different sized/configured workpieces on that particular machine. Alternatively, the top jaws may be removed from one machine so that such jaws may be installed on another machine to allow an additional machining operation to be performed on the same workpiece. This changing of top jaws is a labor intensive operation in that the holding accuracy previously established on the machine is lost once such jaws are removed from the machine. This accuracy must again be established through careful and labor intensive setup of the top jaws on the new machine, and typically must be followed by at least one machining operation of the top jaws after they are again secured to the chuck. On many machines, including certain automatic machines, the need to remachine the top jaws after changeover is a difficult/ expensive operation. Additionally, a particular set of top jaws can only be remachined a limited number of times.

Various companies have attempted to overcome the disadvantages associated with jaw changeover by providing what are now referred to as "quick-change" jaws. These quick-change jaws, which are promoted as providing high accuracy even after jaw changeover, generally include top jaws which cooperate with the underlying master jaws to position such top jaws thereon. These prior art quick-change jaws may approach repositioning accuracies of 0.0001" TIR, but only if each of the top jaws is repositioned on the same master jaw of the same chuck. Accordingly, the top jaws must be labeled when removed from the chuck so as to allow identical repositioning of the jaws on the chuck. An additional drawback associated with many prior art quick-change jaw assemblies is that the design of the assembly allows either external or internal clamping of the workpiece, but not both types of clamping.

One known prior art quick-change jaw assembly designed and commercialized by the assignee herein utilizes a plurality of sub jaws, the sub jaws being mounted to the radially-movable master jaws. Each of the sub jaws includes a ground section connected to the body of such sub jaw by a flexing web. The top jaw is secured to the sub jaw by means of a single, centrally-located screw which engages a threaded hole in the ground section. As the screw is tightened, the ground section is caused to pivot about the web towards the top jaw, thus causing the ground section to positively engage at least one surface of the top jaw thereby locating the top jaw with respect to the sub jaw. This prior art quick-change jaw assembly, although providing repositioning accuracy after jaw changeover, suffers from at least the following disadvantages: 1) Because of the mechanical advantages created by the cooperation of the screw/ground section, overtightening of such screw adversely impacts the tolerances previously established in the top jaw thereby negatively affecting the close tolerance workholding required in a machining operation, particularly when internal clamping of the workpiece is required; 2) The need to utilize sub jaws introduces additional tolerances and costs to the machining operation; and 3) The need to utilize sub jaws results in the top jaws being moved a distance away from the datum plane defined by the face of the chuck thereby magnifying (at the workpiece location) the tolerances found in the components of the chuck and jaw assemblies.

There is therefore a need in the art for a quick-change jaw assembly which provides repositioning accuracies of at least 0.0001" TIR after jaw changeover, even if the top jaws are not repositioned in the identical fashion on the chuck. There is a further need in the art for a quick-change jaw assembly which allows the top jaws to be moved from chuck to chuck while maintaining repositioning accuracies of at least 0.0001" TIR. Finally, there is a need in the art for a quick-change jaw assembly which eliminates the need for a sub jaw assembly, which limits the ability of an operator to adversely impact the tolerances previously established on the top jaw by overtightening of the top jaws to the master jaws and which minimizes the distance between the workpiece and the datum plane defined by the chuck face.

SUMMARY OF THE INVENTION

The present invention, which addresses the needs of the prior art, provides a jaw assembly for holding a workpiece. The jaw assembly includes a master jaw adapted to cooperate with a machine and a top jaw having a workpiece-engaging end. Either the master jaw or the top jaw includes a position locating fixture. The position locating fixture has first and second opposing locating surfaces. The first locating surface is movably positioned on the fixture and is movable between a first position wherein the locating surfaces are spaced a distance $L_1$ and a second position wherein the locating surfaces are spaced a distance $L_2$, $L_2$ being greater than $L_1$. The other of the master and top jaws includes a locating channel having opposing receiving surfaces spaced a distance L wherein L is greater than $L_1$ and less than $L_2$. The locating channel is sized to cooperate with the fixture to move the first locating surface from the first position to the second position upon coupling of the master and top jaws whereupon the locating surfaces are caused to press against the receiving surfaces of the channel to provide a zero clearance fit thereby accurately locating the top jaw with respect to the master jaw.

In one preferred embodiment, the fixture includes a deflectable cantilevered arm with the first locating surface positioned on such arm. In another preferred embodiment, the fixture includes a spring-biased slidable wedge with the first locating surface positioned on such wedge.

As a result, the present invention provides a quick-change jaw assembly which provides repositioning accuracies of at least 0.0001" TIR after jaw changeover, even if the top jaws are not repositioned in the identical fashion on the chuck. The present invention further provides a quick-change jaw assembly which allows the top jaws to be moved from chuck to chuck while maintaining repositioning accuracies of at least 0.0001" TIR. Finally, the present invention provides a quick-change jaw assembly which eliminates the need for a sub jaw assembly, which limits the ability of an operator to adversely impact the tolerances previously established on the top jaw by overtightening of the top jaws to the master jaws and which minimizes the distance between the workpiece and the datum plane defined by the chuck face.

DETAILED DESCRIPTION OF THE INVENTION

Figure 1:
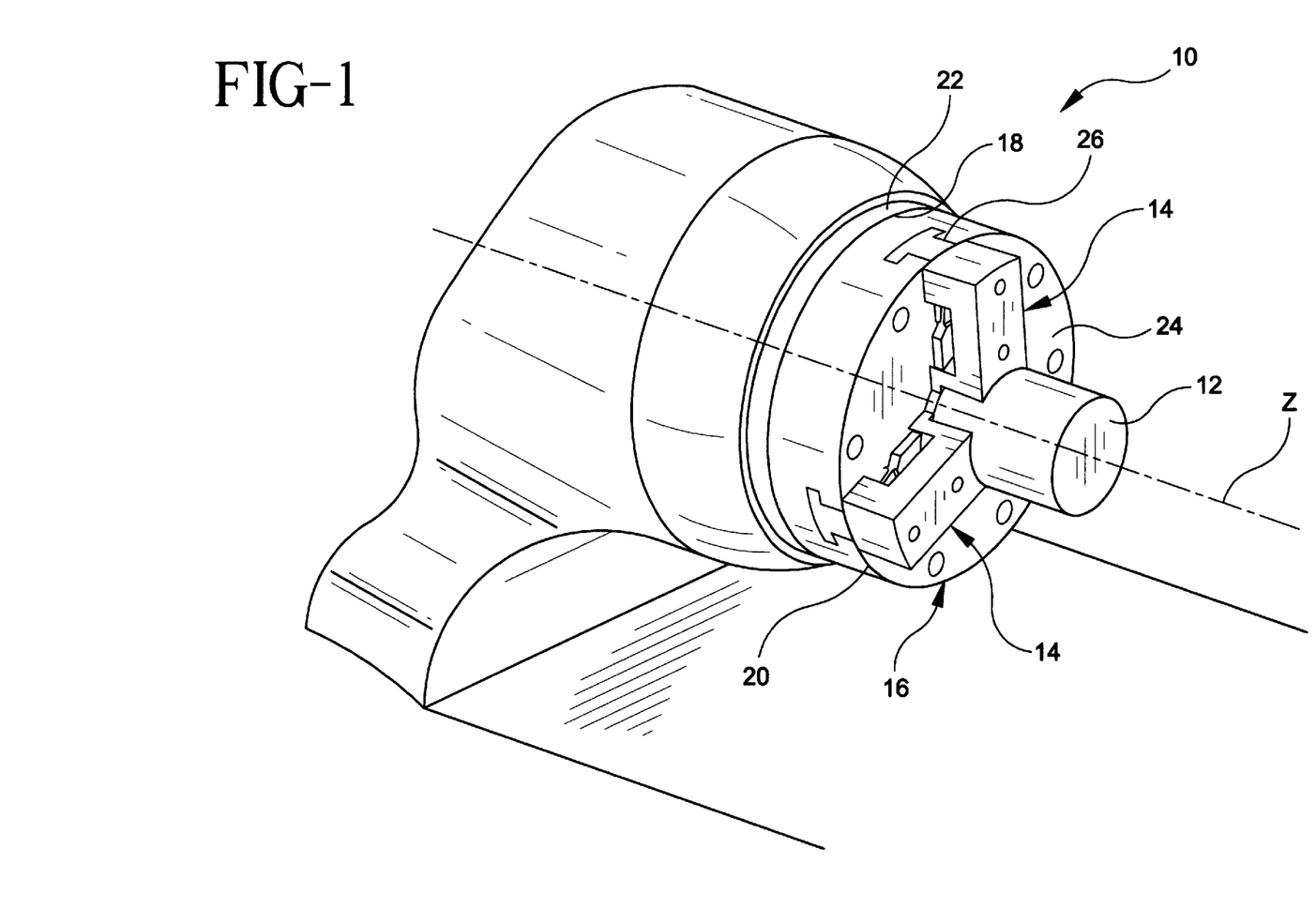
FIG. 1 is a perspective view of a chuck mounted on a turning machine and including the quick-change jaw assembly of the present invention.

Referring to FIG. 1, a turning machine 10, e.g., a lathe, for machining of a workpiece 12 is shown. Workpiece 12 is removably secured to machine 10 by a plurality of movable jaw assemblies 14. Jaw assemblies 14 are carried by a chuck 16 and are spaced equidistantly therearound. Chuck 16 includes three such jaw assemblies-the third being obstructed from view by workpiece 12.

As will be appreciated by those skilled in the art, chucks are commonly used to hold workpieces during various machining operations such as turning, grinding, milling, inspection, etc. These machining operations are often used to manufacture components requiring tolerances no greater than 0.0001 inches. The chucks used to hold the workpieces in these operation must ensure that the workpiece is accurately located with respect to the tool. As a result, these chucks are commonly referred to as precision chucks. The jaw assemblies employed with these chucks are often power actuated, i.e., are moved by an actuating apparatus and the use of compressed air, hydraulics, springs, etc.

The chuck is preferably an elongate, cylindrical body having a mounting end 18 and a working end 20. Mounting end 18 may be configured for direct attachment to machine 10 or may be configured for attachment to an adapter plate 22, which in turn attaches to machine 10. Working end 20 defines a planar chuck face 24. Finally, chuck 16 includes an axis Z extending from mounting end 18 to working end 20, such axis being perpendicular to planar chuck force 24.

The turning machine 10 of FIG. 1 illustrates a situation in which the chuck itself is rotated. In such a design, the power source (e.g., compressed air) is typically supplied through the spindle attaching the chuck/adapter to the machine. Of course, it will be recognized that chucks may be employed in situation where the chuck itself is held stationary and a working tool such as a drill or grinding wheel is moved into cutting engagement with the workpiece.

Chuck 16 includes a plurality of radially-directed T-shaped guide slots 26. A typical chuck (as illustrated in FIG. 1) employs three jaw assemblies for holding the workpiece, and thus the chuck includes three T-shaped guide slots. Of course, the chuck may employ a different number of jaw assemblies (and thereby require a different number of guide slots). Each of guide slots 26 preferably extends radially inward from the outer periphery of chuck 16 so as to allow radially-directed movement of said jaw assemblies. Other guide slot configurations and/or arrangements are contemplated herein.

Figure 2:
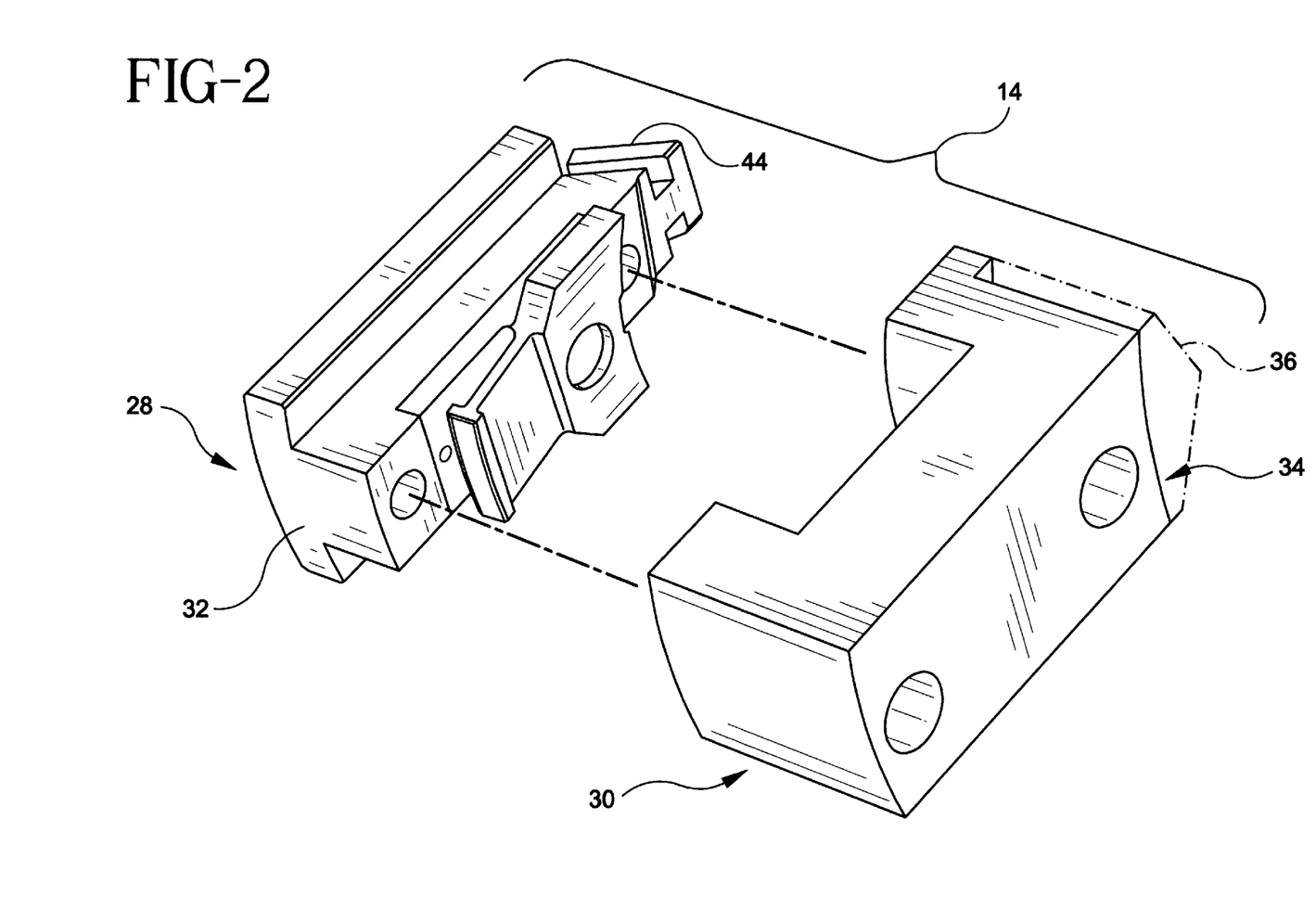
FIG. 2 is an exploded perspective view of the jaw assembly of the present invention.

Referring to FIG. 2, each of jaw assemblies 14 includes a master jaw 28 and a top jaw 30. Each of the master jaws includes a T-shaped body 32 sized to be slidably received by guide slot 26. Once positioned within the guide slot, movement of the master jaws is limited to only radially-directed movement, that is the master jaws are unable to move in a direction perpendicular to chuck face 24 or angularly with respect to chuck face 24. Each of the top jaws includes a workpiece-holding end 34. The top jaws initially include a triangular nose section 36 at their workpiece-holding ends 34, and are referred to in this condition as jaw blanks. The jaw blanks are then machined to hold a specific sized and shaped article. As shown in FIGS. 1–2, ends 34 may be machined to hold a cylindrical workpiece. Of course, other end configurations for holding various sized and shaped workpieces are contemplated herein.

Figure 3:
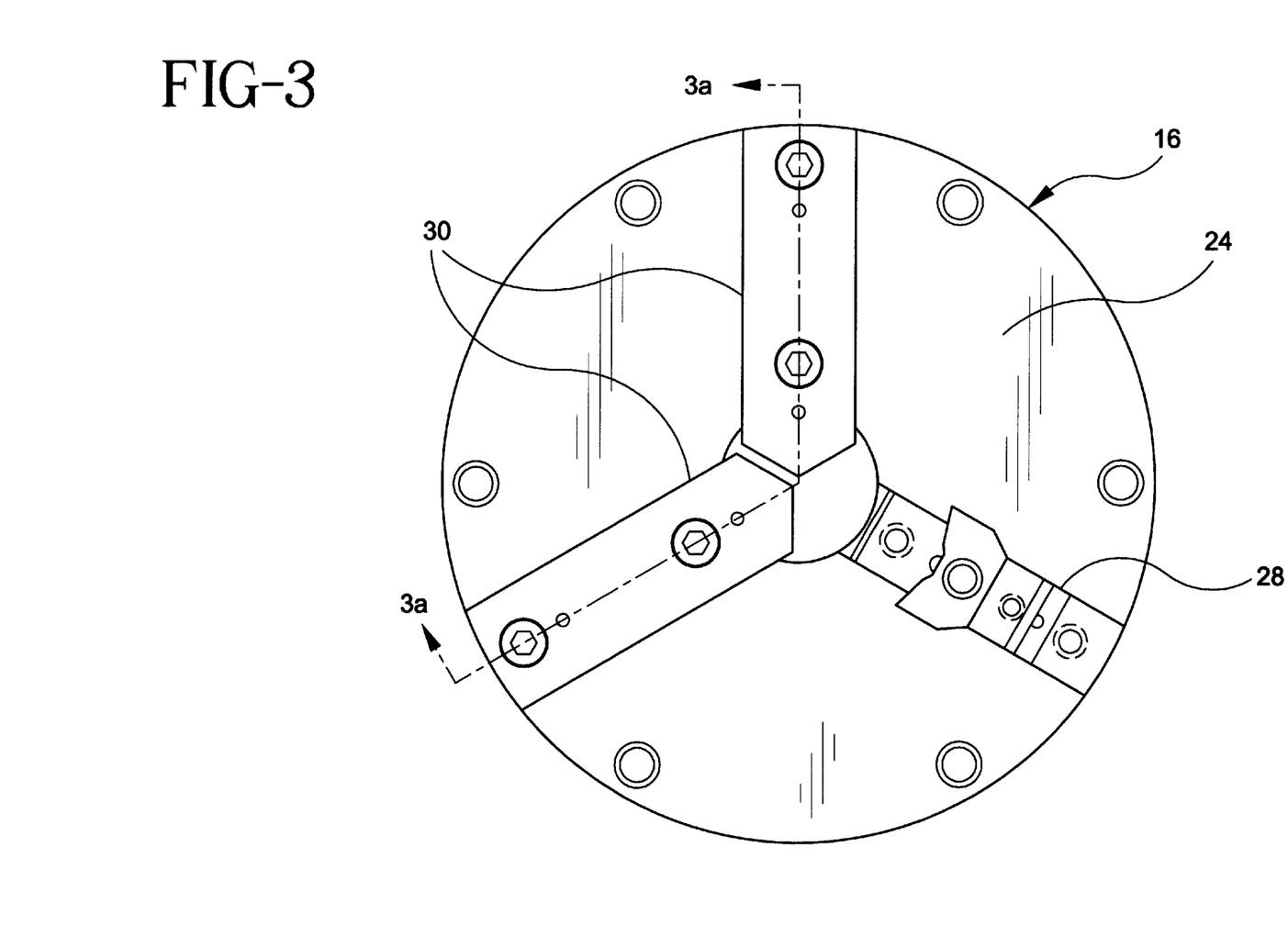
FIG. 3 is a view taken perpendicular to the chuck face wherein one of the top jaws has been removed to show the underlying master jaw.
Figure 3A:
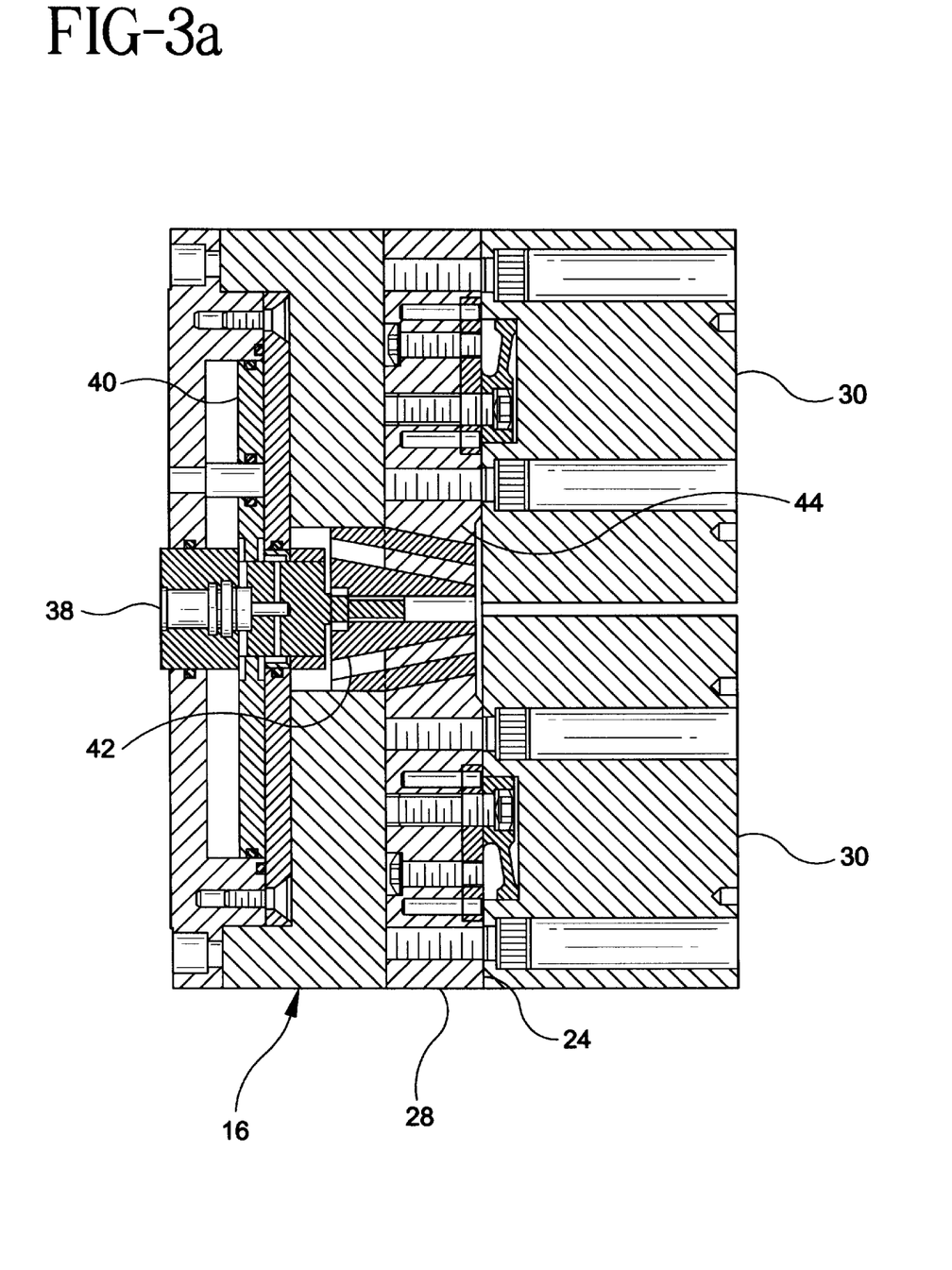
FIG. 3a is a sectional view taken along lines 3a—3a of FIG. 3.

Referring to FIGS. 3–3a, chuck 16 is shown with two top jaw blanks secured thereto, the third jaw blank being removed to show the underlying master jaw. FIG. 3a shows the top jaws in their fully open position. In operation, a source of compressed air (not shown) is connected to air tube inlet 38. Supply of compressed air to the chuck causes piston disc 40 to move in a direction away from chuck face 24 (i.e., to the left as oriented in FIG. 3a), thus causing the actuating mechanism, i.e., center wedge 42, to also move away from chuck face 24.

As will be appreciated by those skilled in the art, movement of center wedge 42 away from chuck face 24 will cause each of master jaws 28 to move radially inward. This is accomplished through coupling of the center wedge to an angled grooved nose 44 (best shown in FIG. 2) located on each of the master jaws. This coupling is commonly referred to as an angled T-slot connection. Specifically, the center wedge moves the jaw assemblies between a holding portion for holding the workpiece and a release position for releasing the workpiece. The holding position may require the jaw assemblies to move radially inward thereby contacting an outer diameter of a workpiece, or may require the jaw assemblies to move radially outward thereby contacting an inner diameter of, for example, a tubular workpiece. It is contemplated herein that other types of actuating mechanisms and/or couplings to the master jaws may be utilized to move the master jaws.

Figure 4A:
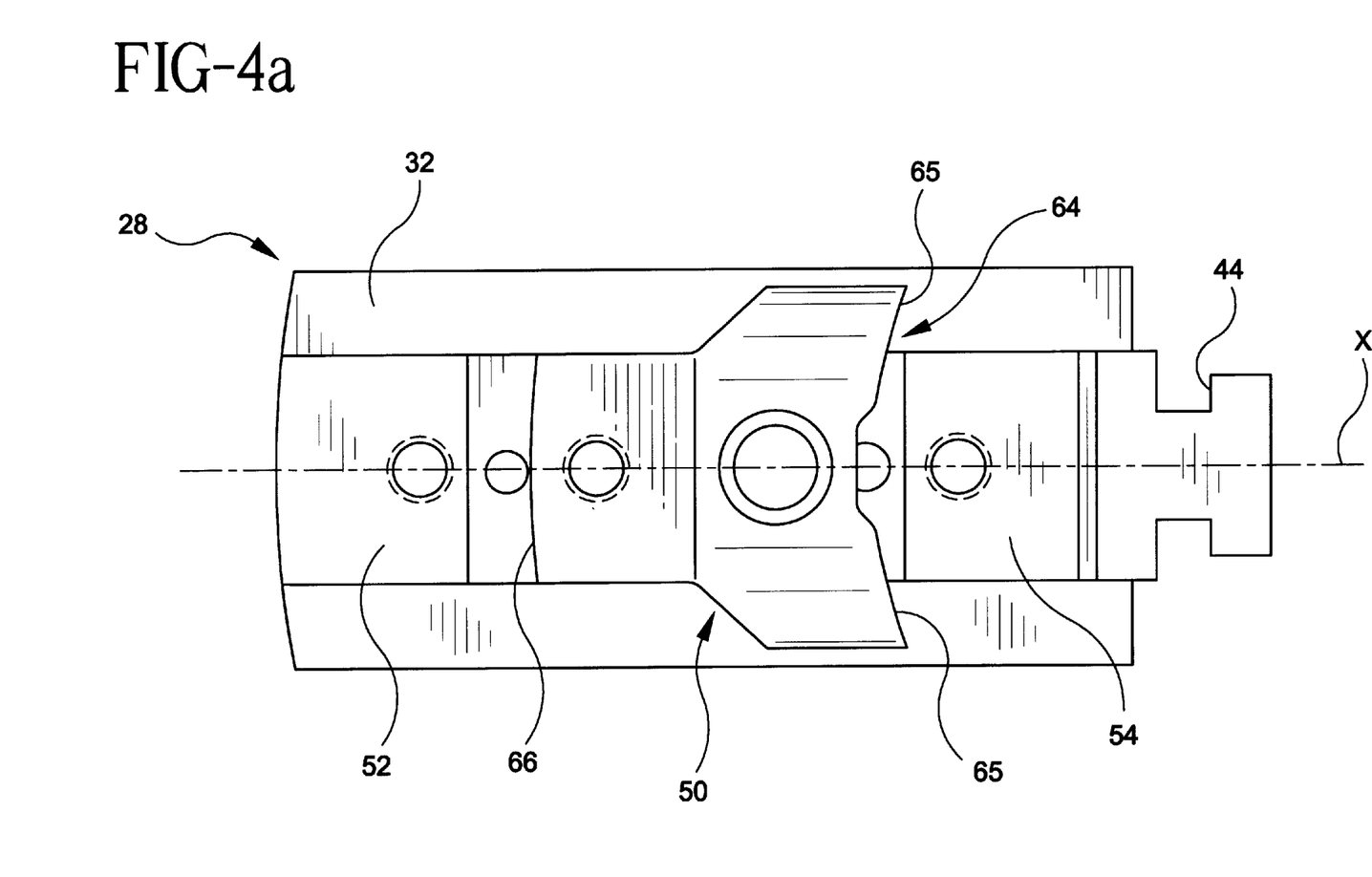
FIG. 4a is a top view of the master jaw of the present invention.
Figure 4B:
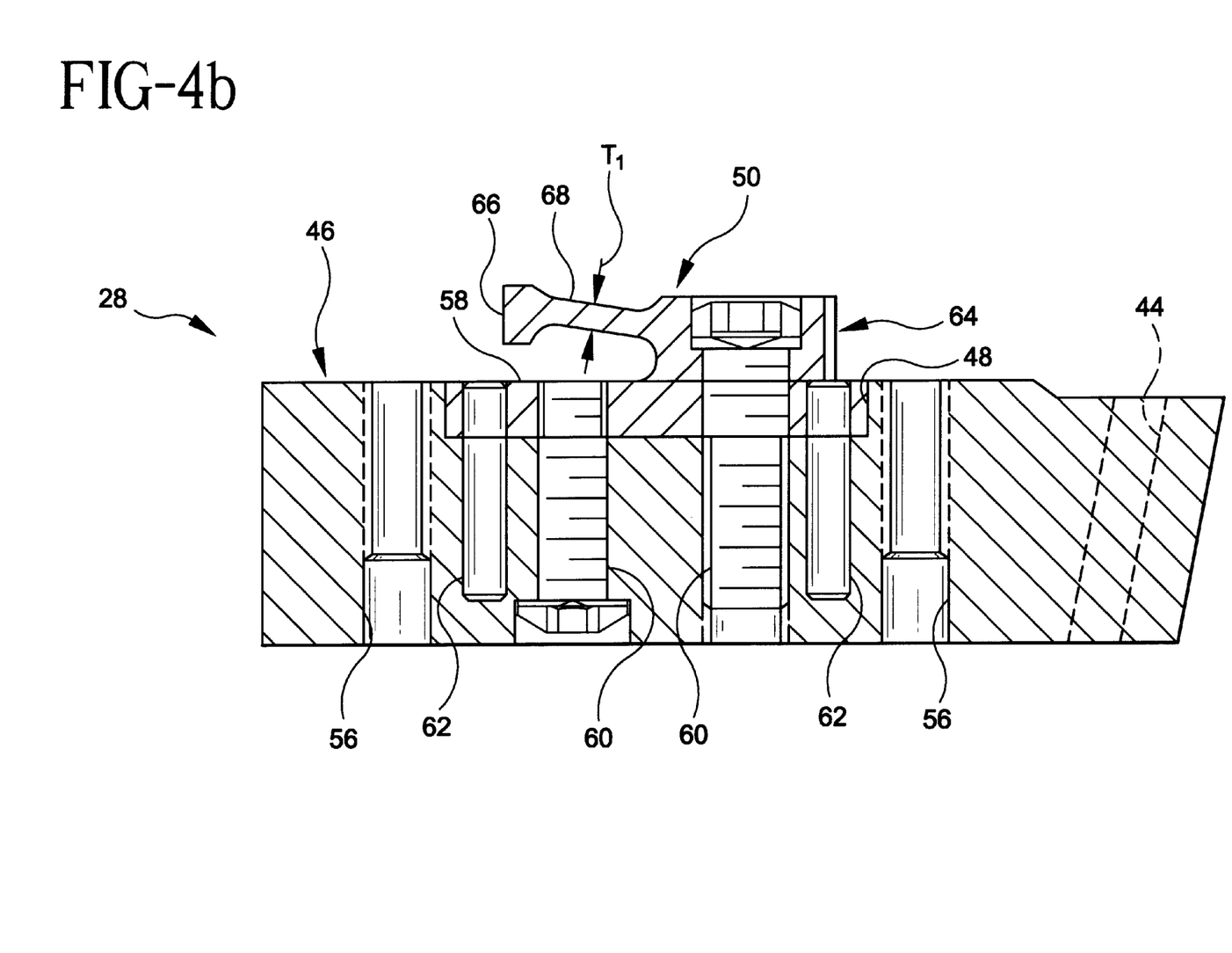
FIG. 4b is a side elevational view of the master jaw of the present invention.

As best shown in FIGS. 4a–4b, master jaw 28 includes a working surface 46. Surface 46 is provided with a recessed notch 48 for receipt of a position locating fixture 50 therein. Working surface 46 includes a pair of precision ground surfaces 52, 54, through which threaded passages 56 extend for subsequent receipt of a screw to allow the top jaw to be coupled thereto.

Position locating fixture 50 is preferably an integral component formed separately from body 32 of master jaw 28 which allows the working surface of the master jaw (without the position locating fixture) and the chuck face to be simultaneously machined as discussed hereinbelow. Of course, in other embodiments the position locating fixture could be formed as an integral part of body 32. Fixture 50 includes a support base 58 sized to be received within recessed notch 48 to allow the fixture to be secured to the master jaw by means of fasteners 60 and locating pins 62.

Fixture 50 includes a pair of concentrically-arranged curved locating surfaces 64, 66. One of the locating surfaces, i.e., surface 64, includes two arcuate sections 65, and is positioned on a stationary portion of fixture 50, thereby remaining in a fixed location with respect to the master jaw at all times. More particularly, surface 64 is located on a portion of the fixture sized and shaped to resist any flexure during coupling of the top jaw to the master jaw. The other of the locating surfaces, i.e., locating surface 66, is positioned on an edge of a cantilevered arm 68. Arm 68 has a configuration and a thickness $T_1$ to allow the aforementioned deflection of the arm without failure or permanent deformation of the material. In one preferred embodiment, the arm can accept loading forces of up to about 10,000 lbs per jaw.

Figure 5A:
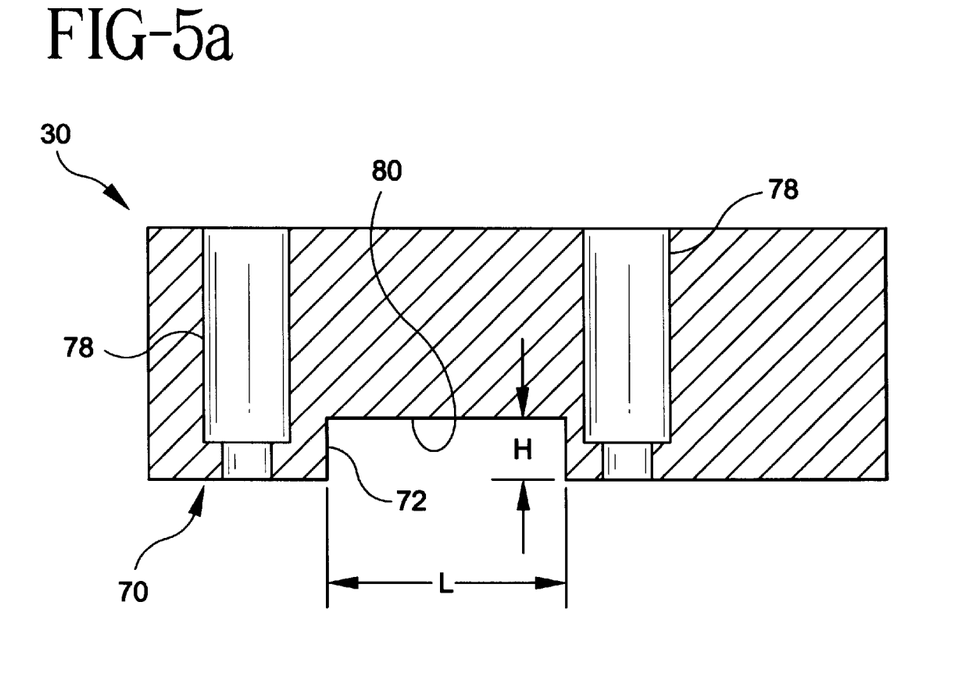
FIG. 5 is a side elevational view of the top jaw of the present invention.
Figure 5B:
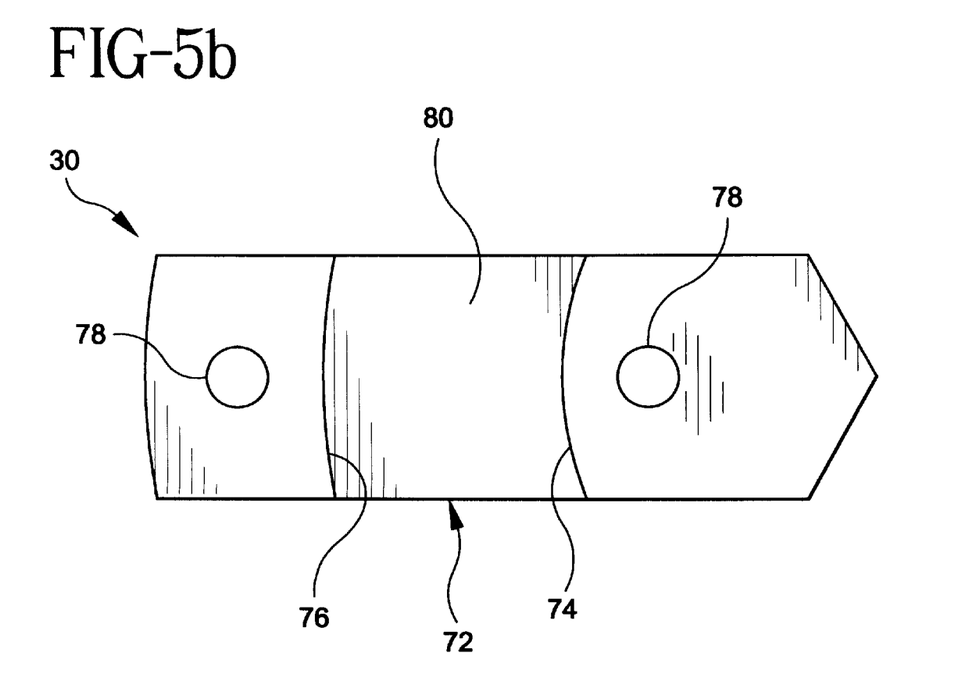
FIG. 5b is a bottom view of the top jaw of the present invention.

Referring to FIGS. 5a–5b, each of top jaws 30 includes a surface 70 having a locating channel 72 formed therein. Channel 72 includes concentrically-arranged curved receiving surfaces 74, 76. Top jaw 30 further includes a pair of opposing apertures 78 spaced to align with threaded apertures 56 located on master jaw 28 whereby said top and master jaw may be coupled together with a fastener, e.g., a screw. Receiving surfaces 74, 76 are spaced a distance L (wherein L is 0.9475 inches) from one another, while surface 70 is spaced a distance H (wherein H is 0.270 inches) from contact surface 80.

Figure 5C:
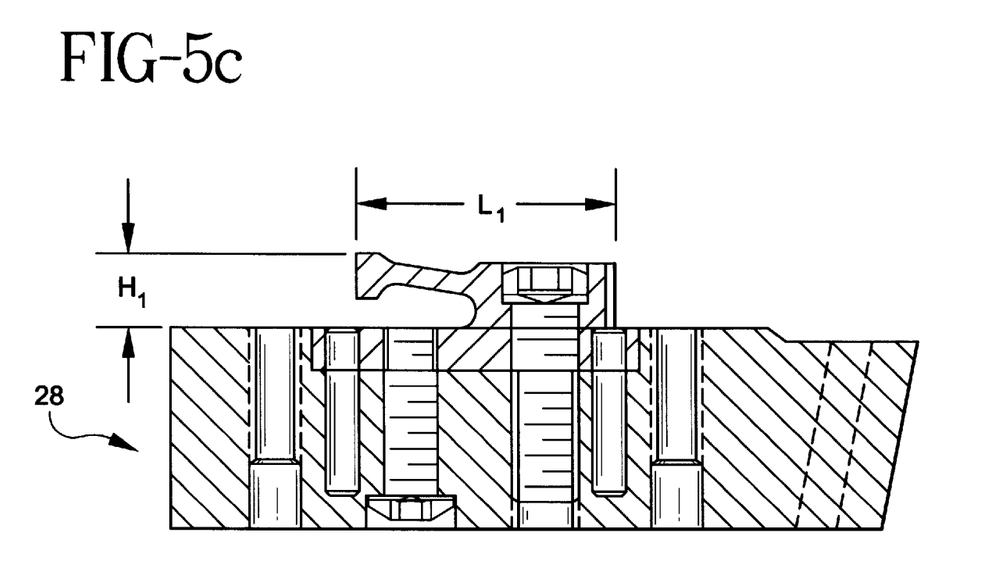
FIG. 5c is a side elevational view of the master jaw wherein the cantilevered arm is in its at rest position.
Figure 5D:
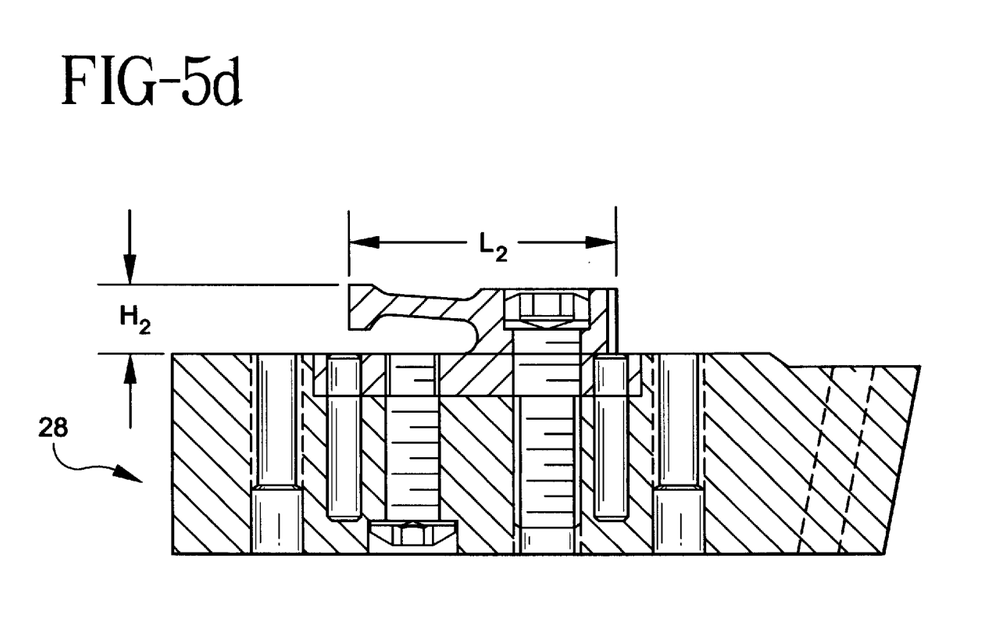
FIG. 5d is a side elevational view of the master jaw wherein the cantilevered arm is in its deflected locating position.

Referring to FIGS. 5c–5d, cantilevered arm 68 is angularly deflectable between position $P_1$ (shown in FIG. 5c) wherein length $L_1$ is 0.9460 inches and height $H_1$ is 0.278 inches and position $P_2$ (shown in FIG. 5d) wherein $L_2$ is 0.9485 inches and height $H_2$ is 0.270 inches. Of course, the dimensions set forth above (i.e., H, $H_1$, $H_2$, L, $L_1$ and $L_2$) are only illustrative of one preferred embodiment, and can be varied as required.

Coupling of top jaw 30 to master jaw 28 causes arm 68 to contact channel 72. Thereafter, tightening of top jaw 30 to master jaw 28 causes arm 68 to deflect towards working surface 46 of the master jaw, resulting in the distance between curved locating surfaces 64 and 66 to increase from $L_1$ (0.9460 inches) to $L_2$ (0.9485 inches). Inasmuch as dimension $L_2$ (0.9485 inches) is greater than dimension L (0.9475 inches), the deflection of arm 68 within channel 72 will produce a "zero play" or zero clearance precision fit therewith. It will be recognized that the 0.001" difference between L and $L_2$ provides the arm with a degree of tolerance which will be absorbed by the arm itself during coupling of the top jaw to the master jaw.

Figure 6A:
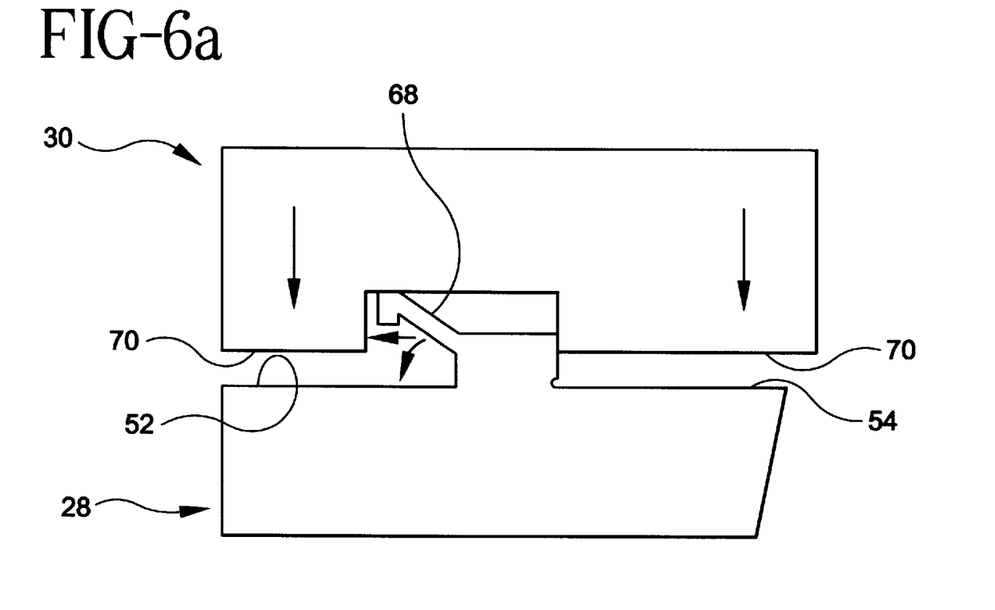
FIG. 6a–6b are side elevational views of the master jaw/top jaw assembly showing the deflection of the cantilevered arm in exaggerated form.
Figure 6B:
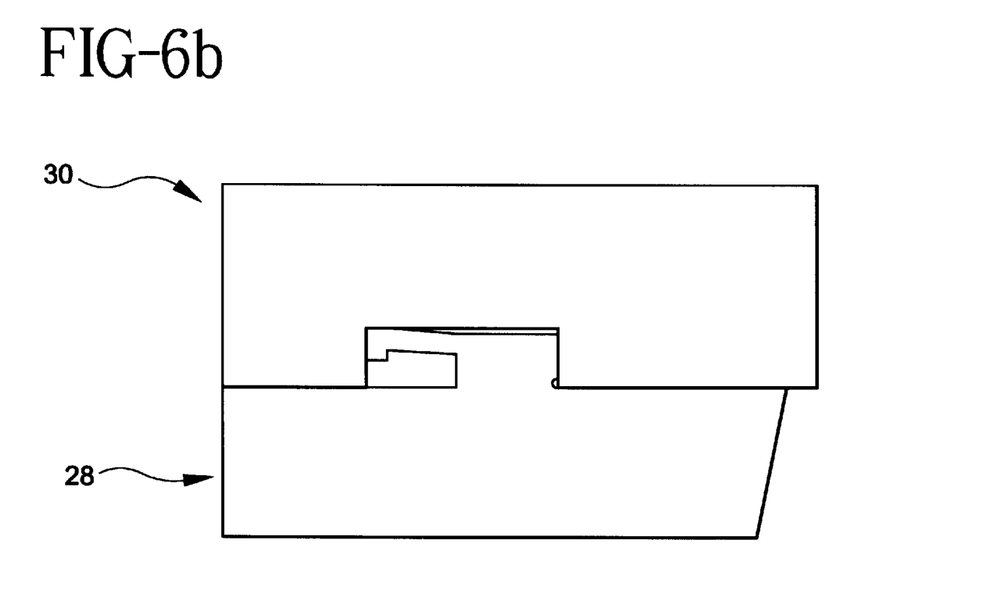

The interaction of locating fixture 50 and channel 72 is more readily understood by reference to FIGS. 6a–6b, which illustrate the deflection of arm 68 in exaggerated form. As shown, facing surfaces 70 of top jaw 30 contact and thus rest against precision ground surfaces 52, 54 of working surface 46. The precision ground surfaces provide a positive stop for travel in a direction along axis Z, i.e, for travel perpendicular to chuck face 24. The zero clearance fit established through deflection of arm 68 positively locates the top jaw with respect to the workpiece in the radial direction, i.e., along guide slot 26.

Figure 7A:
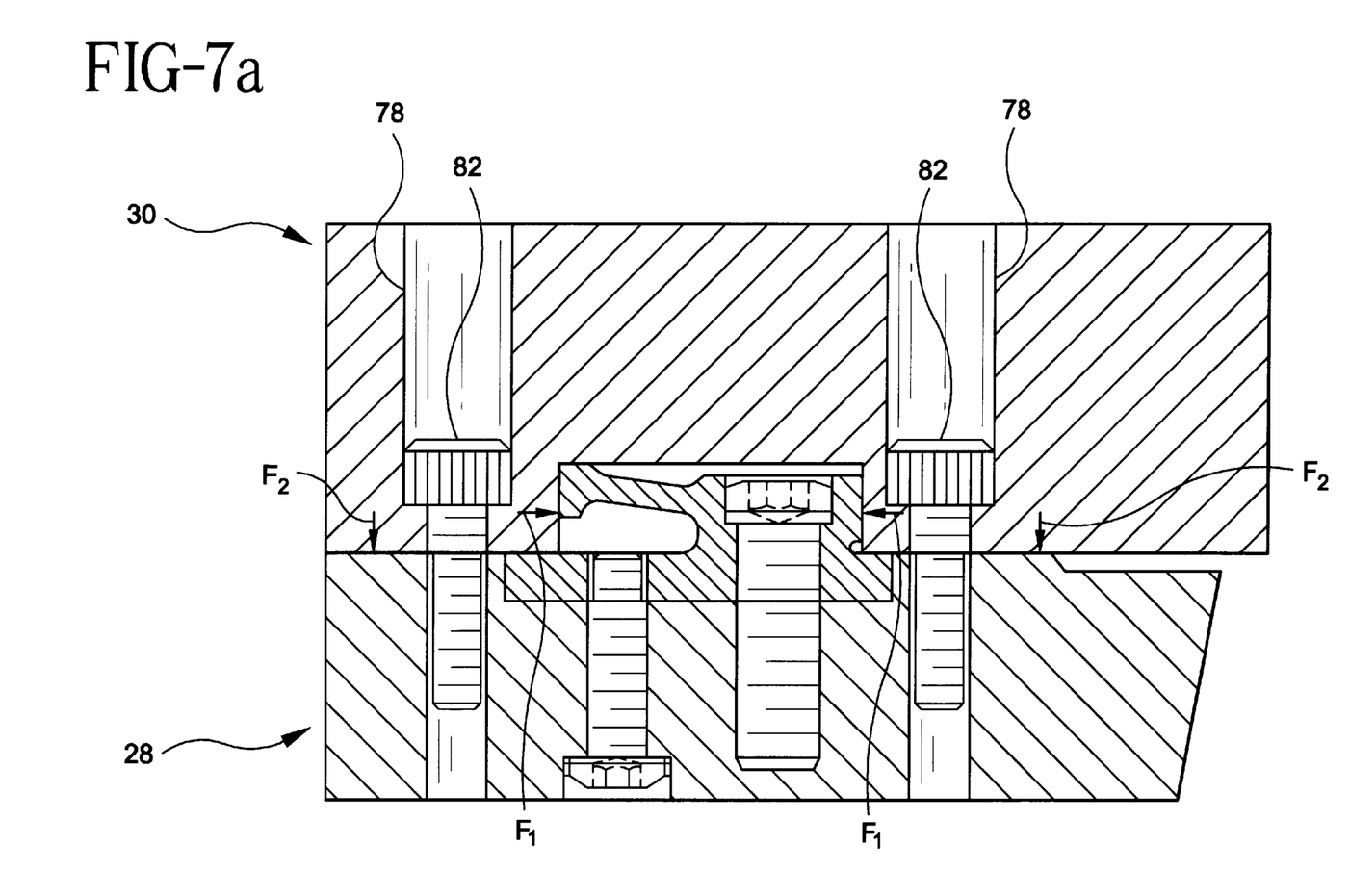
FIG. 7a is a side elevational view showing the top and master jaw coupled together.
Figure 7B:
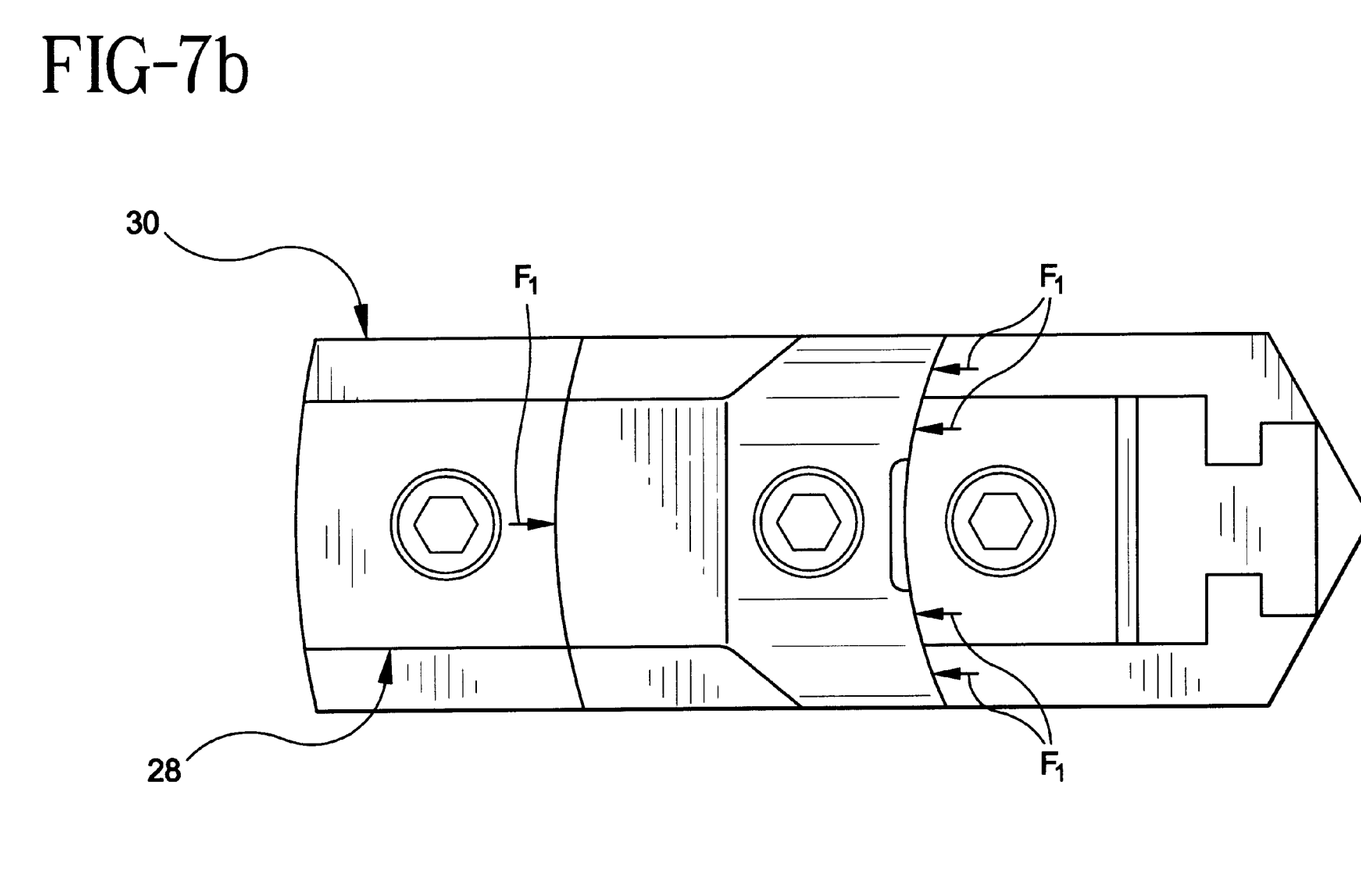
FIG. 7b is a top view showing the top and master jaw coupled together.

The coupling of top jaw 30 to master jaw 28 is illustrated in more detail in FIGS 7a–7b. As shown, apertures 78 are perferably countersunk to facilitate insertion of screws 82 therein. The tightening of screws 82 causes arm 68 to deflect towards working surface 46 of master jaw 28, thus 28, thus creating positive interference between curved location surfaces 64, 66 and curved receiving surfaces 74, 76, as illustrated by arrows $F_1$. Unlike the prior art quick-change assembly discussed in the Background, the fixture defines at least one continuous structural pathway for the contact forces between receiving surfaces 74, 76 within the channel region. The tightening of screws 82 further causes positive interference between surface 70 of top jaw 30 and the precision ground surfaces of master jaw 28, as illustrated by arrows $F_2$. Unlike the prior art quick-change assembly discussed in the Background, any tendency of the arm to "push" the top jaw out of specification during deflection is resisted by screws 82.

As best shown in FIGS. 4a and 7b, surface 64 defines an arc having a length substantially similar to the length of the arc defined by surface 74. It will be recognized that the greater the length of the arc, the greater the locating effect of the surface with respect to the mating top jaw. Inasmuch as the arc defined by surface 64 is significantly greater than the arc defined by surface 66, surface 64 will control the location of the fixture in channel 72. Each of arcuate sections 65 contacts the channel of the top jaw at locations which are symmetrical about axis X. Surface 66 provides the third contact point, preferably contacting the channel along axis X.

It will be appreciated by those skilled in the art that use of concentrically-arranged locating and receiving surfaces (as best seen in FIG. 7b) contributes to the repeatable accuracy of the jaws, even after changing of jaws, by ensuring that the jaw is always accurately directed towards the center of the chuck face. Moreover, positioning of the jaw in a direction perpendicular to the chuck face is controlled by positive contact with precision ground surfaces 52, 54, while positioning of top jaw in the radial direction is controlled by the zero clearance fit created through deflection of arm 68.

Master jaw 28 is preferably dimensioned such that precision ground surfaces 52, 54 are spaced a distance $Z_1$ (0.000040 inches) from chuck face 24 when the master jaw is positioned in guide slot 26. Preferably, this is accomplished by removing fixtures 50 from master jaws 28 and thereafter positioning the master jaws into guide slots 26. The chuck face/master jaw combination is then machined by use a lapping machine to provide one continuous surface. At this point, the master jaws are removed and the chuck face is again machined on the lapping machine to remove 0.000040" of material. As a result, the portions of surface 70 (of top jaw 30) which extend beyond the width of working surface 46 (of master jaw 28) effectively ride on the chuck face during movement of the jaw assemblies, as can be seen from the witness marks left on chuck face during operation.

Figure 8A:
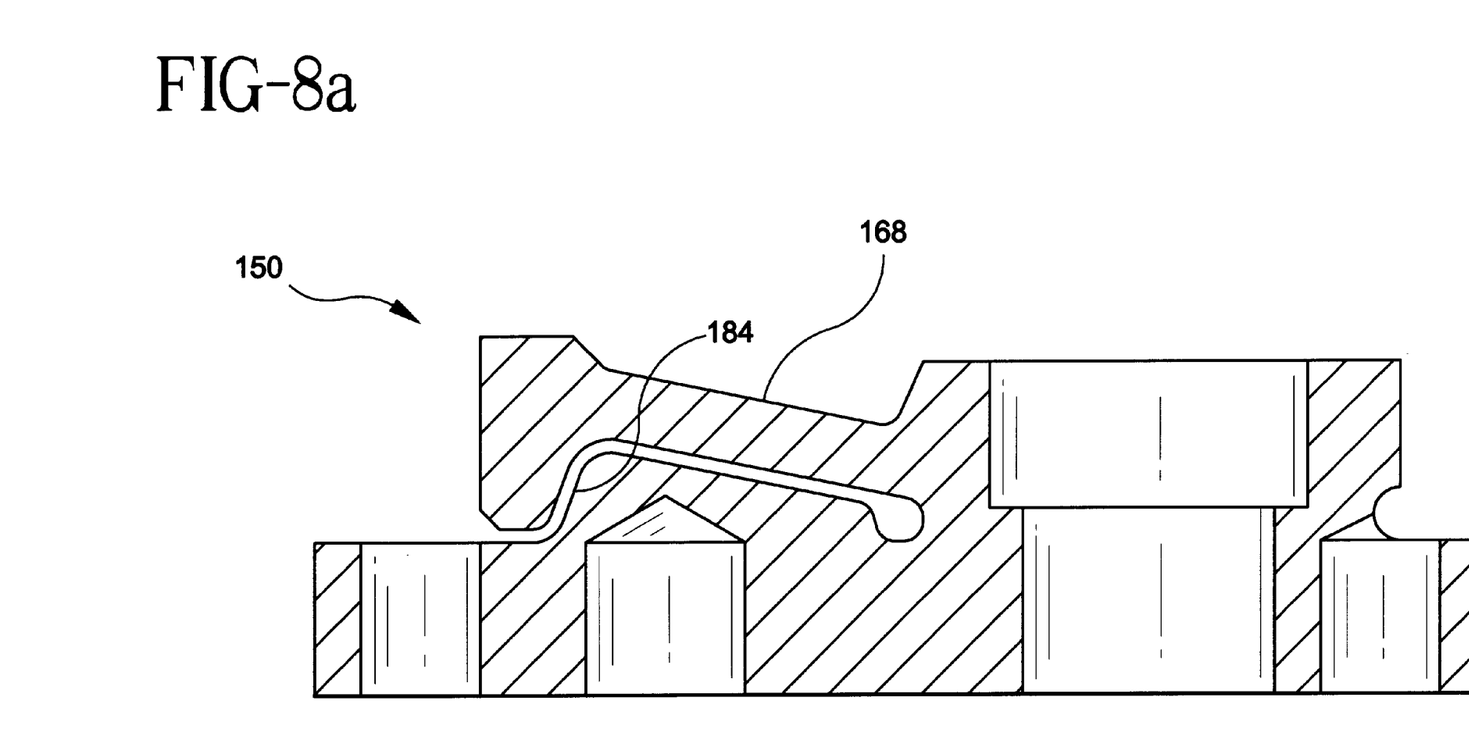
FIG. 8a is an alternative embodiment of the position locating the fixture of the present invention.

In one alternative embodiment, as shown in FIG. 8a, the position locating fixture, i.e., fixture 150, includes a positive stop 184 for the cantilevered arm, i.e., arm 168. Thus, if fully deflected, arm 168 will contact and thus rest against stop 184 thereby preventing further deflection of the arm which can result in permanent deformation of such arm.

Figure 8B:
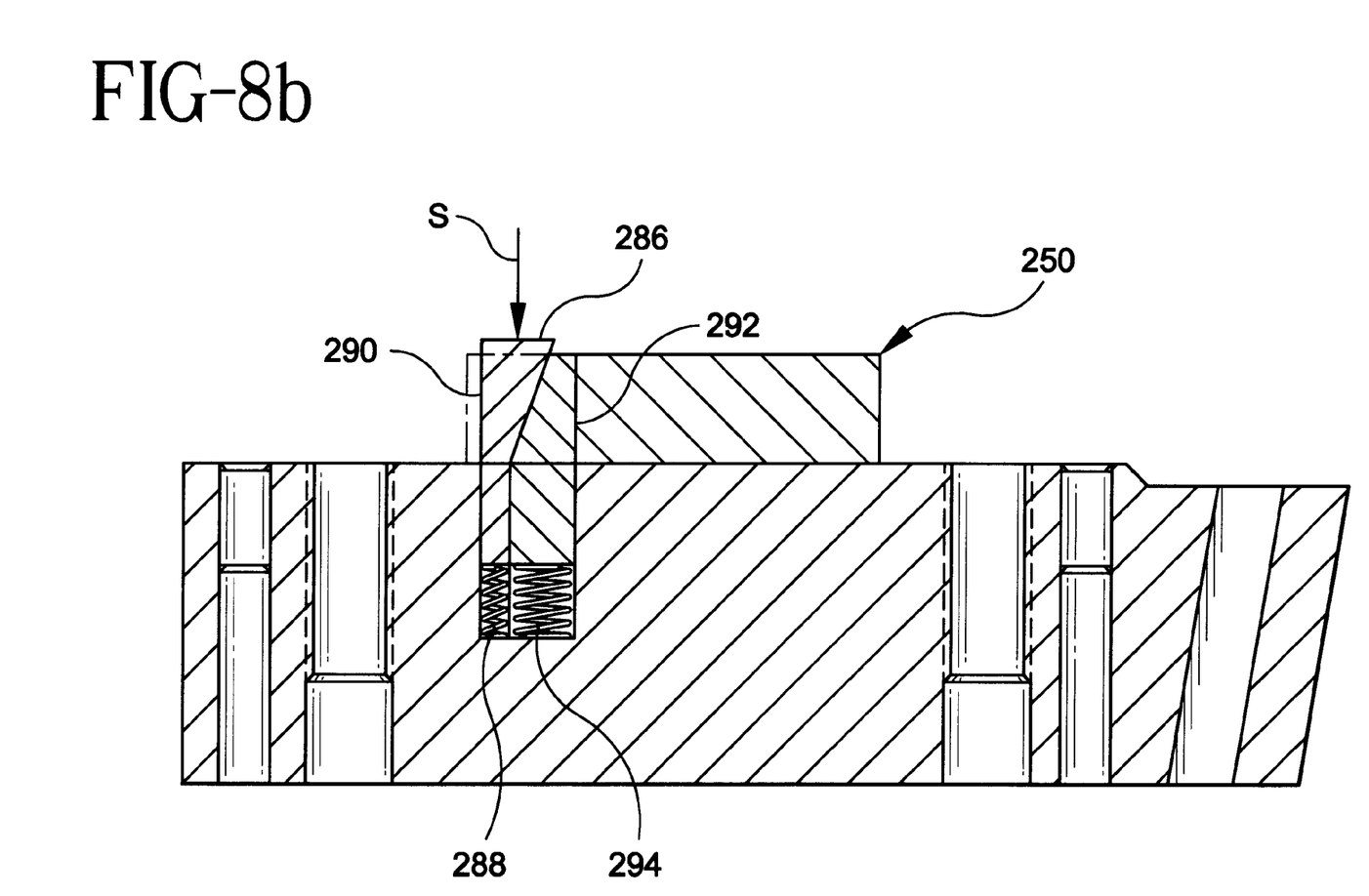
FIG. 8b is another alternative embodiment of the position locating fixture of the present invention.

In another alternative embodiment, as depicted in FIG. 8b, the position locating fixture, i.e., fixture 250, includes a sliding wedge 286 which is spring loaded by coil spring 288. As top jaw 30 is coupled to the master jaw, contact surface 80 will press against the wedge 286 (as illustrated by arrow S), thereby forcing the wedge in the direction of arrow S. Movement of the wedge in the direction of arrow S simultaneously causes edge 290 of the wedge to move outward (i.e., to the left in FIG. 8b) to the position illustrated in phantom. Edge 290 is preferably a curved locating edge similar to locating surface 66. Fixture 250 may additionally include movable leg 292 which acts against coil spring 294. Coil spring 294 has a greater spring resistance than spring 288. As a result, leg 292 and spring 294 allow wedge 286 to overtravel if necessary, thus building a degree of tolerance into the fixture.

Figure 8C:
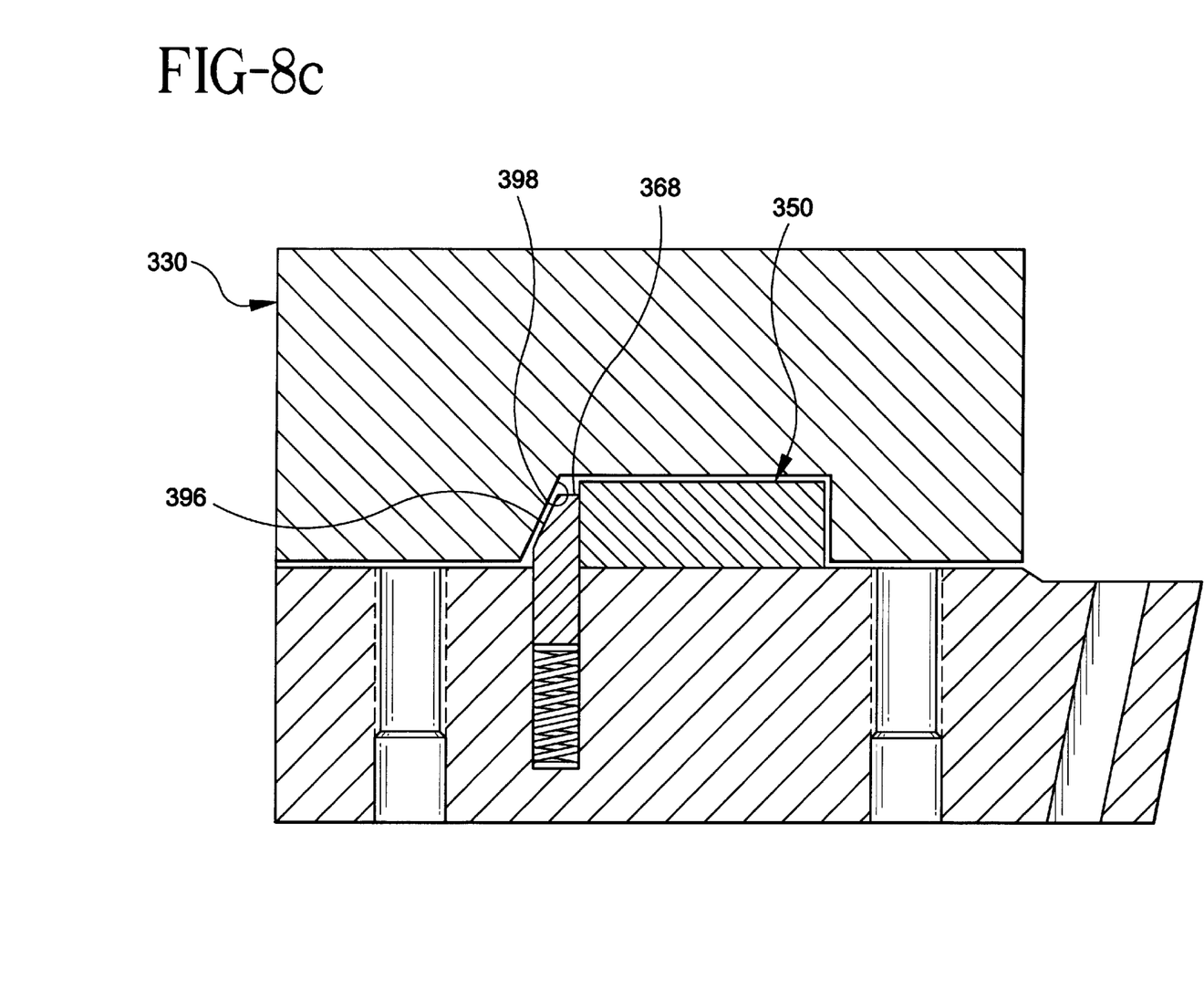
FIG. 8c is still another embodiment of the position locating fixture of the present invention.

In a still further embodiment, as depicted in FIG. 8c, the position locating fixture, i.e., fixture 350, includes a single spring loaded wedge 368. Edge 396 of wedge 368 is preferably a curved locating edge similar to locating surface 66. It will be recognized that as the top jaw is coupled to the master jaw, angled surface 398 of the top jaw 330 will press against edge 396 of fixture 350, thus creating a zero clearance fit.

While there have been described what are presently believed to be the preferred embodiments of the invention, those skilled in the art will realize that various changes and modifications may be made to the invention without departing from the spirit of such invention. All such changes and modifications which fall within the scope of the invention are therefore intended to be claimed.

What is claimed is:

1. A jaw assembly for holding a workpiece, comprising:
   a master jaw adapted to cooperate with a machine;
   a top jaw having a workpiece-engaging end; and
   wherein one of said master and top jaws includes a position locating fixture, said fixture having first and second opposing locating surfaces, wherein said first locating surface is movably positioned on said fixture and is movable between a first position wherein said surfaces are spaced a distance $L_1$ and a second position wherein said surfaces are spaced a distance $L_2$, $L_2$ being greater than $L_1$; and
   wherein the other of said master and top jaws includes a locating channel having opposing receiving surfaces spaced a distance L wherein L is greater than $L_1$ and less than $L_2$, said locating channel being sized and configured to positively engage said fixture to move said first locating surface from said first position to said second position upon coupling of said master and top jaws whereupon said locating surfaces are caused to press against said receiving surfaces of said channel to provide a zero clearance fit thereby accurately locating said top jaw with respect to said master jaw.

2. The jaw assembly of claim 1, wherein said fixture includes a deflectable cantilevered arm, and wherein said first locating surface is positioned on said cantilevered arm.

3. The jaw assembly of claim 1, wherein said fixture includes a spring-biased slidable wedge, and wherein said first locating surface is positioned on said wedge.

4. The jaw assembly of claim 1, wherein said fixture provides a continuous structural pathway between said receiving surfaces within said locating channel.

5. The jaw assembly of claim 1, wherein said master jaw includes a body having at least one working surface.

6. The jaw assembly of claim 5, wherein said top jaw includes a first surface for engaging at least a portion of said working surface of said master jaw when said master and top jaws are coupled together.

7. The jaw assembly of claim 6, wherein said working surface of said master jaw includes a pair of precision ground planar surfaces located on opposing sides of said position locating fixture for subsequent engagement with at least two portions of said first surface of said top jaw.

8. The jaw assembly of claim 7, wherein each of said top and master jaws include cooperating fastening mechanisms to allow said jaws to be coupled together, each of said ground planar surfaces including one of said fastening mechanisms.

9. A quick-change jaw assembly for use with a chuck, comprising:
   a chuck having a mounting end and a working end, said working end including a planar chuck face, said working end further including a plurality of radially-directed channels;
   a plurality of jaw assemblies, each of said jaw assemblies associated with one of said channels and configured to cooperate therewith so as to allow radially-directed movement of said jaw assemblies within said channels while limiting movement of said jaw assemblies in non-radially-directed directions;
   a power actuator carried by said chuck and operatively connected to said jaw assemblies for moving said jaw assemblies between a first position for holding said workpiece and a second position for releasing said workpiece; and
   wherein each of said jaw assemblies includes a master jaw and a top jaw, said master jaw including a body having at least one working surface, said master jaw further including a position locating fixture secured to said working surface, said fixture having a pair of opposing concentrically-arranged curved locating surfaces, wherein one of said locating surfaces is movably mounted to said fixture;
   said top jaw including a workpiece-engaging end and a first side, said first side including a locating channel having opposing concentrically-arranged curved receiving surfaces, said locating channel being sized to cooperate with said fixture to move said movably mounted locating surface whereupon said curved locating surfaces are caused to press against said receiving surfaces of said channel to provide a zero clearance fit thereby accurately locating said top jaw with respect to said master jaw.

10. The jaw assembly of claim 9, wherein said fixture includes a deflectable cantilevered arm, and wherein said first locating surface is positioned on said cantilevered arm.

11. The jaw assembly of claim 10, wherein said arm is deflectable between a first position wherein said curved locating surfaces are spaced a distance $L_1$ from each other and a second position wherein said locating curved surfaces are spaced a distance $L_2$ from each other, said distance $L_2$ being greater than distance $L_1$.

12. The jaw assembly of claim 9, wherein said fixture includes a spring-biased slidable wedge, and wherein said first locating surface is positioned on said wedge.

13. The jaw assembly of claim 9, wherein said fixture provides a continuous structural pathway between said receiving surfaces within said locating channel.

14. The jaw assembly of claim 9, wherein said body of said master jaw has a T-shaped cross-section, and wherein said guide channel in said working end of said chuck is configured to slidably receive said body therein.

15. The jaw assembly of claim 9, wherein said position locating fixture is removably secured to said working side of said master jaw.

16. The jaw assembly of claim 9, wherein said master jaw includes coupling means whereby said master jaw is operatively connected to said power actuator.

17. The jaw assembly of claim 9, wherein said working surface of said master jaw includes a pair of precision ground planar surfaces located on opposing sides of said position locating fixture for subsequent engagement with at least two portions of said first surface of said top jaw.

18. The jaw assembly of claim 17, wherein said body of said master jaw is dimensioned so that said ground planar surfaces are substantially coplanar with said chuck face when said master jaw is positioned in said guide channel of said chuck, and wherein said first surface of said top jaw has a width greater than the width of said working side of said master jaw whereby at least a portion of said first surface of said top jaw rides on said chuck face during radially-directed movement of said jaw assemblies.

* * * * *